United States Patent
Naito et al.

(10) Patent No.: US 7,914,273 B2
(45) Date of Patent: Mar. 29, 2011

(54) OPTICAL COMPONENT MOLDING APPARATUS

(75) Inventors: Atsushi Naito, Aichi-ken (JP); Kanji Sekihara, Aichi-ken (JP); Yoshihiro Okumura, Aichi-ken (JP); Akihiko Matsumoto, Aichi-ken (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/259,395

(22) Filed: Oct. 26, 2005

(65) Prior Publication Data
US 2006/0093700 A1  May 4, 2006

(30) Foreign Application Priority Data
Oct. 29, 2004 (JP) .................... 2004-316771

(51) Int. Cl.
    *B29C 45/26* (2006.01)
(52) U.S. Cl. ......... 425/190; 425/567; 425/588; 425/808
(58) Field of Classification Search .................. 425/190, 425/567, 588, 808, 572; 264/328.8
    See application file for complete search history.

(56) References Cited

U.S. PATENT DOCUMENTS

| | | | | |
|---|---|---|---|---|
| 4,184,835 A * | 1/1980 | Talbot | ........................... | 425/577 |
| 4,828,769 A | 5/1989 | Maus et al. | | |
| 4,840,553 A * | 6/1989 | Arai | ........................... | 425/129.1 |
| 4,900,242 A * | 2/1990 | Maus et al. | ................... | 425/149 |
| 5,093,049 A * | 3/1992 | Uehara et al. | ................... | 264/2.2 |
| 5,288,222 A * | 2/1994 | Wieser | ........................... | 425/190 |
| 5,750,060 A * | 5/1998 | Maus et al. | ................... | 264/40.5 |
| 6,210,610 B1 * | 4/2001 | Saito et al. | ...................... | 264/2.2 |
| 6,488,413 B1 * | 12/2002 | Wan | ................................ | 385/78 |
| 6,779,998 B2 * | 8/2004 | Goral et al. | ................... | 425/112 |
| 6,824,382 B2 * | 11/2004 | Ganz | ............................ | 425/589 |
| 2004/0081717 A1 * | 4/2004 | Marazita | ....................... | 425/150 |
| 2005/0012243 A1 * | 1/2005 | Saeki et al. | ................ | 264/328.8 |

(Continued)

FOREIGN PATENT DOCUMENTS

CN        87104162(A)        12/1987

(Continued)

OTHER PUBLICATIONS

English abstract and computer translation for JP 2002-240108.*

(Continued)

*Primary Examiner* — Yogendra N Gupta
*Assistant Examiner* — Emmanuel S Luk
(74) *Attorney, Agent, or Firm* — Brinks Hofer Gilson & Lione (57) ABSTRACT

A purpose is to provide an optical component molding apparatus for producing a small-size and high-precision optical component and achieving good transferability and stability of a molded product. A multi-cavity molding machine 100 has a gate 51, a runner 52, and a sprue 53 each having the shape determined to meet conditions (1) to (5): (1) "Miminum gate thickness"/"Maximum runner thickness" is in a range of more than 0.2 to less than 1.0; (2) "Gate length"/"Maximum runner thickness" is in a range of more than 0.4 to less than 4.0; (3) "Outlet diameter of sprue" is in a range of more than 1.0 mm to less than 5.5 mm; (4) "Sprue length" is in a range of more than 10 mm to less than 40 mm; and (5) "Outlet diameter of sprue"/"Inlet diameter of sprue" is in a range of more than 1 to less than 8.

10 Claims, 5 Drawing Sheets

U.S. PATENT DOCUMENTS

2005/0212154 A1* 9/2005 Inoue et al. .................. 264/1.32

FOREIGN PATENT DOCUMENTS

| | | |
|---|---|---|
| CN | 200580026172.5 | 8/2009 |
| JP | 54-148055 | 11/1979 |
| JP | 59-53858 | 11/1979 |
| JP | 05-329905 | 12/1993 |
| JP | 06-039882 | 2/1994 |
| JP | 06-344108 | 12/1994 |
| JP | 10-193396 | 7/1998 |
| JP | 10-193401 | 7/1998 |
| JP | 11-042685 | 2/1999 |
| JP | 2000-042143 | 2/2000 |
| JP | 2000-218628 | 8/2000 |
| JP | 2001-124902 | 5/2001 |
| JP | 2001-166108 | 6/2001 |
| JP | 2001-272501 | 10/2001 |
| JP | 2002-011546 | 1/2002 |
| JP | 2002-240108 * | 8/2002 |
| JP | 2002-321256 | 11/2002 |
| JP | 2003-114368 | 4/2003 |
| JP | 2003-145584 | 5/2003 |
| JP | 2003-245946 * | 9/2003 |

OTHER PUBLICATIONS

English abstract and computer translation for JP 2003-245946.*

Rosato et al., Injection Molding Handbook, 3ed., 2000, Kluwer Academic Publishers, pp. 251, 733-735, 738, 739.*

Herbert Rees, Understanding Injection Molding Design, 2001, Hanser Publishers, pp. 59, 63 and 64.*

International Search Report issued in International Application No. PCT/JP2005/013565, dated Oct. 18, 2005 (in English and Japanese language, 5 pages).

First Office Action issued in U.S. Appl. No. 11/194,882 dated Nov. 13, 2008.

Final Rejection Office Action issued in U.S. Appl. No. 11/194,882 dated May 12, 2009.

"Shaping System for Accurate Optical Elements," China Academic Journal Electronic Publishing House, vol. 17, Jun. 30, 2000.

Restriction Requirement dated Sep. 23, 2008 issued in related U.S. Appl. No. 11/194,882.

Non-final Office Action dated Nov. 13, 2008 issued in related U.S. Appl. No. 11/194,882.

Final Office Action dated May 12, 2009 issued in related U.S. Appl. No. 11/194,882.

Notice of Panel Decision from Pre-Appeal Brief Review dated Nov. 25, 2009 issued in related U.S. Appl. No. 11/194,882.

International Search Report PCT/JP2005/019099, dated Jan. 24, 2006.

Japanese Office Action (JP 2006-542995)—with translation—mailed Nov. 2, 2010, in counterpart Japanese Patent Application.

* cited by examiner

OPTICAL COMPONENT MOLDING APPARATUS

CROSS-REFERENCE TO RELATED APPLICATIONS

This application is based upon and claims the benefit of priority from the prior Japanese Patent Application No. 2004-316771 filed on Oct. 29, 2004, the entire contents of which are incorporated herein by reference.

BACKGROUND OF THE INVENTION

1. Field of the Invention

The present invention relates to an optical component molding apparatus for molding optical components and, more particularly, to an optical component molding apparatus for molding optical components each of which has a small size (an outer diameter of 2 mm to 12 mm) and high precision (surface roughness Ra of 20 nm or less).

2. Description of Related Art

Recently, optical components such as objective lens are formed in a manner of injection molding using a thermoplastic resin (refer to, for example, Patent Documents 1 and 2). Since, by molding optical components using a plastic, products of uniform configuration can be produced quickly, the molding is suitable for mass production thereof. Optical instruments utilizing the plastic lens have a tendency toward miniaturization and higher performance from year to year. Accompanying this, requests for miniaturization and higher precision of the plastic lens are also increasing.

Further, as a technique for mass production of optical components, there has been studied a so-called multi-cavity molding technique for molding a plurality of molded products in a single mold-clamping and resin-injecting operation. A mold used for the multi-cavity molding has a single sprue centrally provided in a fixed mold and a plurality of runners arranged around the sprue. That is, lens transfer sections are arranged around the sprues. In this multi-cavity molding technique, how to increase the number of molded products while reducing variations in transferability to each transfer section has a large influence on commercial profit.

[Patent Document 1] Japanese Published Unexamined Patent Application No. 11(1999)-42685

[Patent Document 2] Japanese Published Unexamined Patent Application No. 2001-272501

However, the above molding of plural optical components having a small size and high precision would be problematic in the following points. To be concrete, it is known in the injection molding of optical components that each shape of a gate and a runner has an influence on transferability for molding and stability of molded products. It is further noted that the shape of a sprue as well as the shapes of gate and runner exerts an influence on the transferability for molding and the stability of molded products.

For instance, when the thickness of the gate (hereinafter, "gate thickness") is small, a flow channel for resin is sharply narrowed down at the gate. To ensure good transferability, therefore, the resin has to be injected at high speed. This may cause large shear heating. This results in a high temperature condition of the resin, leading to a deterioration in the quality of the resin. Also, stress likely concentrates on near the gate and thus birefringence would appear significantly. Further, such molded products are likely to become deformed during mold releasing and lack product stability.

If the diameter of an outlet of the sprue is small, the temperature of the resin is decreased fast. This makes it insufficient to inject resin into the transfer section and consequently difficult to achieve good transferability. Further, other defects such as a demolding failure of molded products, remaining in the fixed mold, and a mold-releasing failure would inevitably arise. If the sprue has an outlet of a large diameter, in contrast, it would take a long time to cool and solidify the resin in the sprue. In other words, the cooling time (duration) is determined depending on the time needed for solidifying the resin in the sprue. This makes it difficult to shorten a producing cycle. The injection pressure and injection speed of resin would be unstable, leading to instability of molded products.

SUMMARY OF THE INVENTION

The present invention has been made to overcome at least one of the above problems in the conventional optical component molding apparatus and to provide an apparatus for molding optical components of a small size and high precision and capable of achieving good transferability and stability of molded products.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an optical component molding apparatus for simultaneously producing a plurality of optical components, the apparatus comprising: a fixed mold; and a movable mold which is brought into contact with and separated away from the fixed mold; wherein the fixed mold and the movable mold in a contact state under pressure provide a sprue, a runner, a gate, and a shape transfer section into which a resin material is injected through the sprue, the runner, and the gate to produce the plurality of optical components, each of which having an outer diameter of 2 mm to 12 mm and an optical surface with surface roughness of 20 nm or less, and the gate and the runner are formed to have thickness respectively determined to meet a condition (1) of: $0.2 < \text{"Minimum gate thickness"}/\text{"Maximum runner thickness"} < 1$ (1).

The optical component molding apparatus according to the present invention, specifically, is arranged to meet the above condition (1) about a relationship in size between the gate and the runner. In other words, the above relation (1) can avoid a sharp decrease of area of the flow channel at the gate, and achieve good flowability of resin. Consequentially, excellent transferability can be ensured. Since the stress near the gate is reduced, birefringence can also be reduced.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of the present invention will now be given referring to the accompanying drawings. In the present embodiment, the present invention is applied to a molding machine for plastic lens. A product (article) to be molded is a plastic lens that has an outer diameter of 2 mm to 12 mm and an optical surface of surface roughness Ra of 20 nm or less. This plastic lens includes a lens portion and a flange portion formed on the periphery of the lens portion. The flange portion is a part to be supported by a lens holder or the like. Such plastic lens is usable in an optical-pickup optical system in an optical pickup device, an imaging optical system of a cellular phone with a built-in camera, and others.

Figure 1:
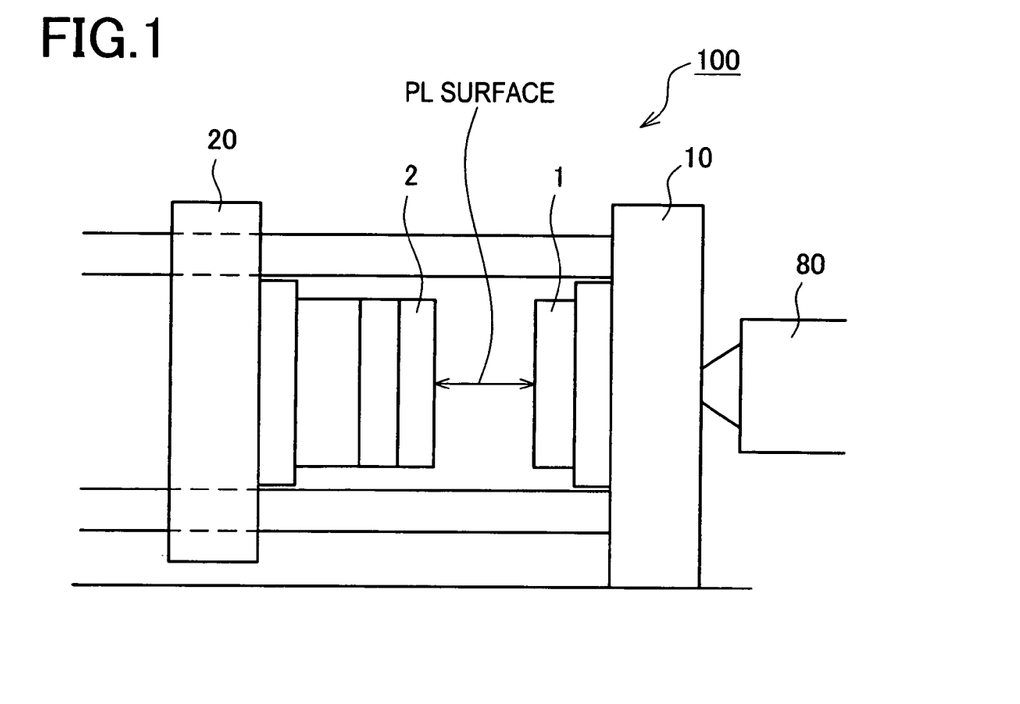
FIG. 1 is a view schematically showing a structure of a plastic lens molding machine (that molds are in a separated state) in a preferred embodiment.
Figure 2:
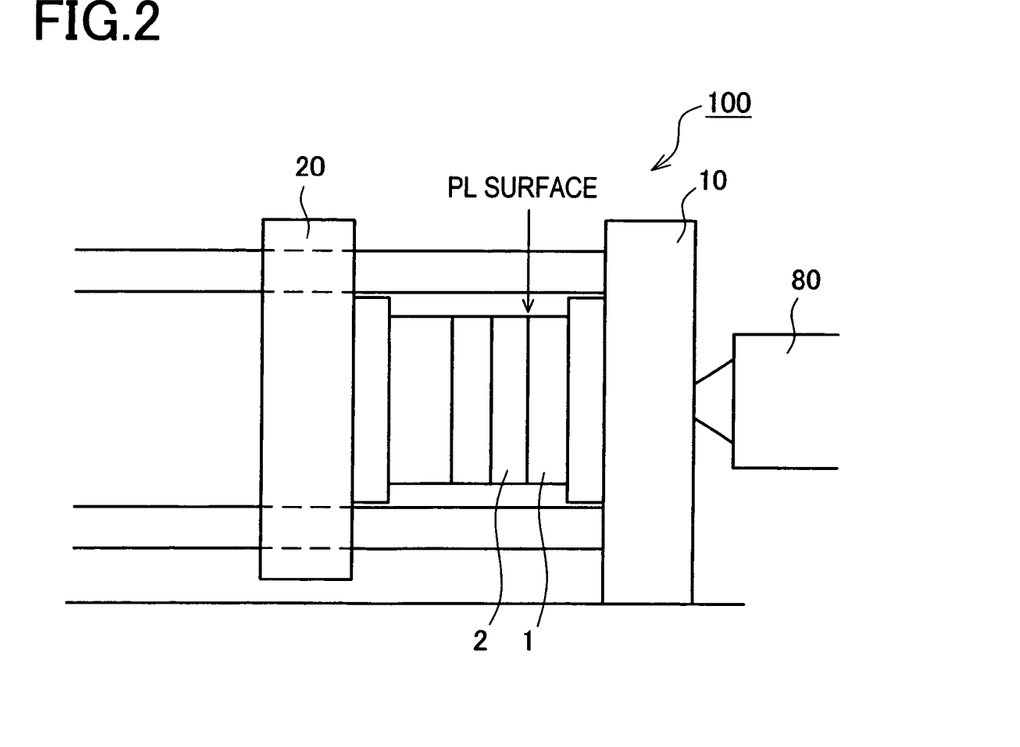
FIG. 2 is a view schematically showing the structural of the plastic lens molding machine (that the molds are in a contact state under pressure)
Figure 3:
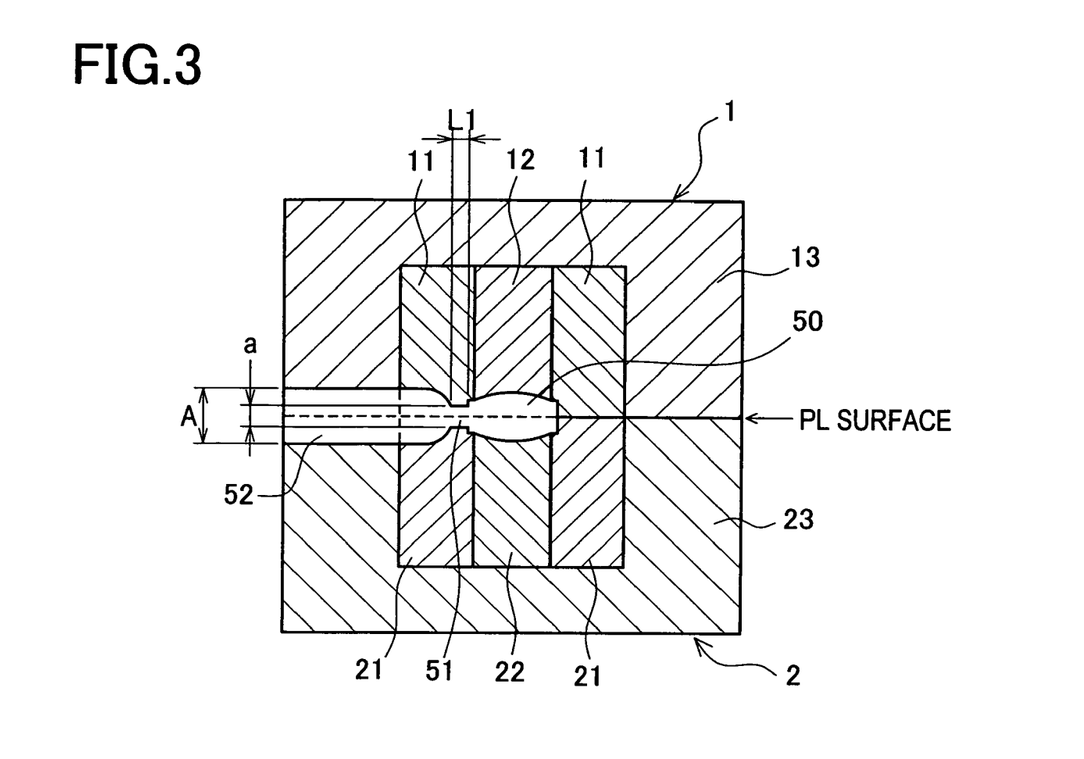
FIG. 3 is a sectional side view schematically showing a structure of molds for plastic lens.
Figure 4:
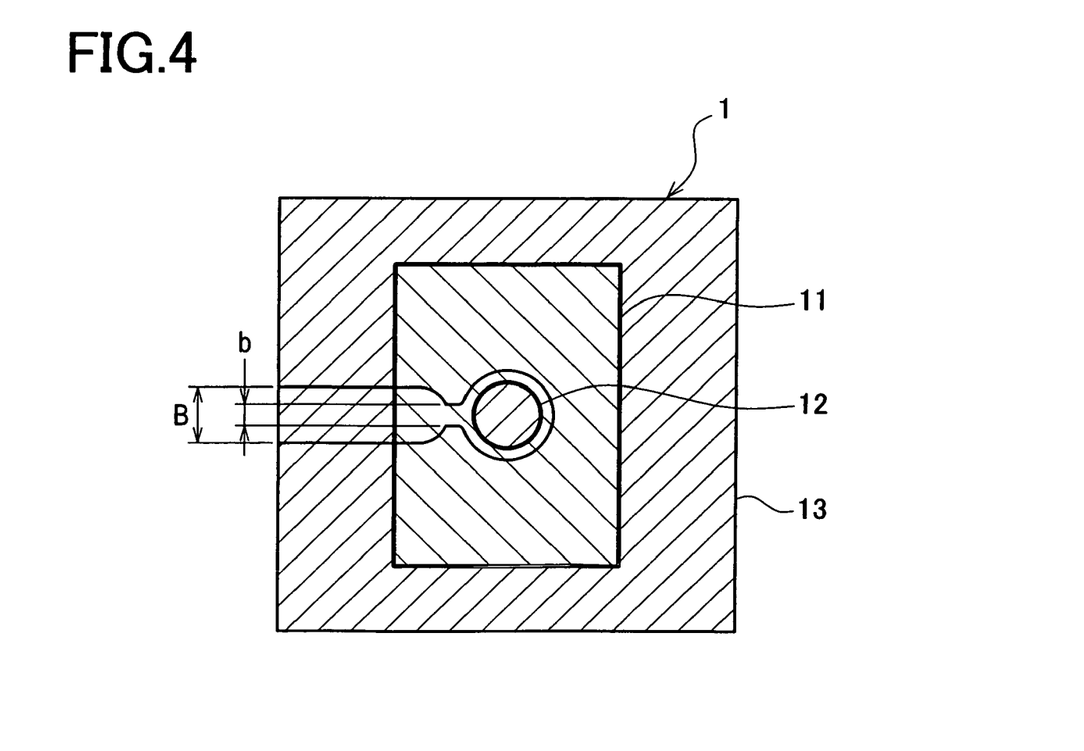
FIG. 4 is a view showing a pressure-contact surface of a mold for plastic lens.
Figure 10:
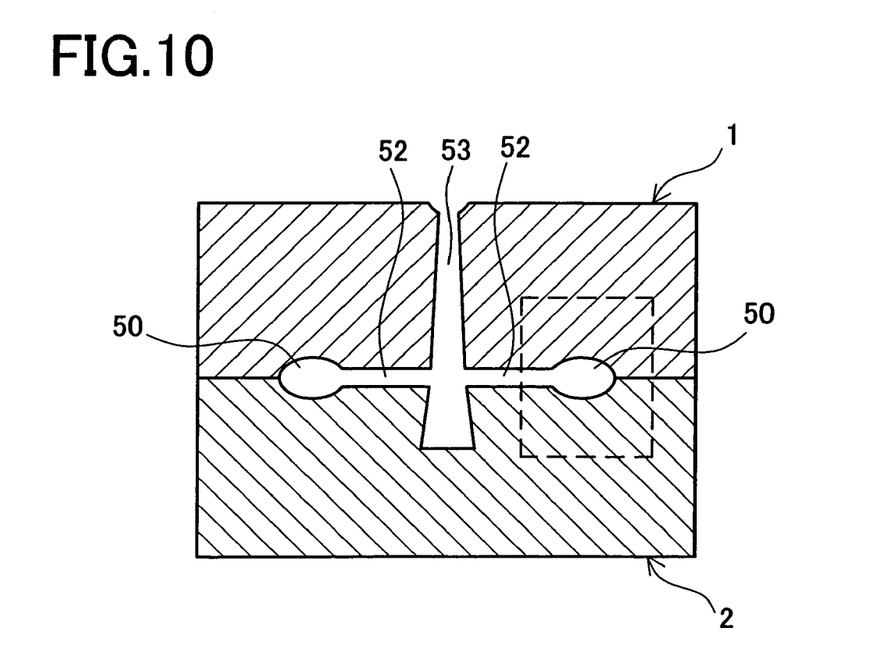
FIG. 10 is a sectional view showing an entire structure of the molds.

FIGS. 1 and 2 schematically show a structure of a molding machine 100 in the present embodiment. Specifically, FIG. 1 shows a separated state of molds; and FIG. 2 shows a pressure-contact state of the molds. FIGS. 3, 4, and 10 schematically show structures of the molds in the present embodiment. Specifically, FIGS. 3 and 10 are a sectional side view of the molds showing the pressure-contact state; and FIG. 4 shows a pressure-contact surface of a fixed mold. It is to be noted that FIG. 3 is an enlarged view of a part indicated by a broken line in FIG. 10.

To be concrete, as shown in FIG. 1 or 2, the plastic lens molding machine 100 in the present embodiment includes a fixed platen 10 provided with a fixed mold 1 and a movable platen 20 provided with a movable mold 2 which can be brought into contact under pressure and separated away from the fixed mold 1. The molding machine 100 in the present embodiment is a compact molding machine capable of generating a mold-clamping force of the order of 15 tons (150 kN).

The fixed platen 10 is formed with an inlet through which molten resin is injected from an injection unit 80 into the mold 1. This injection unit 80 may be either a preplasticization type or an in-line screw type.

The molding machine 100 is structured as shown in FIG. 3 such that a cavity 11 is inserted in a base mold 13 of the fixed mold 1 and further a core 12 is inserted in the cavity 11. Similarly, a cavity 21 is inserted in a base mold 23 of the movable mold 2 and further a core 22 is inserted in the cavity 21. That is, the cavity and core are structured as an insert in the base mold. In this specification, a member formed with a transfer section for forming the lens portion of a plastic lens will be referred to as the "core" and a member formed with a transfer section for forming the flange portion arranged on the periphery of the lens portion will be referred to as the "cavity".

The base mold 13 is of a rectangular outer shape as seen from the pressure-contact surface (PL face) side. Further, the cavity 11 is also of a rectangular outer shape as seen from the pressure-contact surface as shown in FIG. 4. The core 12 is of a circular outer shape as seen from the pressure-contact surface side. The movable mold 2 is identical in structure to the base mold 13.

The base mold 13, specifically, is provided with a pocket (recess) to receive the cavity 11. This pocket is formed to have a slightly larger width than the width of the cavity 11. A gap generated between the cavity 11 and the base mold 13 when the cavity 11 is inserted in the base mold 13 is filled with a spacer block. This spacer block serves to adjust the position of the cavity 11 and also fix the cavity 11.

When the movable mold 2 is brought into pressure contact with the fixed mold 1, a void is generated in the combined molds 1 and 2 (see FIGS. 3 and 10). This void provides a shape transfer section 50, a gate 51, a runner 52, and a sprue 53 forming a flow channel through which molten resin is allowed to flow from the inlet to the runner 52.

Preferably, the surface of the transfer section of a transfer member (core or cavity) should be applied with metallic plating. A metallic plated layer is formed to have a predetermined thickness in a range of 10 μm to 100 μm. To provide an optical path difference providing structure (e.g., a diffractive lens) on a transfer surface, it is preferable to provide it by machining (cutting) the plated layer. For improving mold releasability and protecting molds, a surface treatment using chromium nitride, titanium nitride, diamond-like carbon (DLC), etc. may be applied. This makes it possible to enhance flowability of resin in the mold during molding and transfer, and separability (mold releasability) of molded products from the molds.

The following explanation will be made on a process of producing plastic lenses by means of the molding machine 100 in the present embodiment. It is to be noted that the molding machine 100 in the present embodiment is configured as a multi-cavity molding machine to simultaneously produce a plurality of plastic lenses, but the following description will be made on one plastic lens to be molded for convenience of explanation. In this molding machine 100, in a state that the two molds are held in pressure contact with each other, molten resin is injected into the shape transfer section 50 through the sprue, the runner 52, and the gate 51 in this order. After the resin injected into the molds is distributed around the shape transfer section 50 and then cooled and solidified, the movable mold 2 is separated away from the fixed mold 1. A molded product is ejected by an ejector or the like. This ejected molded product integrally consists of a plastic lens body, a flange portion arranged on the periphery of an optical surface of the plastic lens body, and other portions corresponding to the sprue 53, the runner 52, and the gate 51. The portion corresponding to the gate 51 is cut out in a later cutting process. Thus the plastic lens is produced.

As for the molding conditions for plastic lens, for example, in the case where an amorphous polyolefin resin is used as the molten resin, the temperature of the molds is 120° C.; the temperature of the resin is 280° C.; the injection speed is 50 mm/sec; and the dwelling pressure is 100 MPa. The amorphous polyolefin resin may include Zeonex® (Zeon Corporation) and Apel® (Mitsui Chemicals).

As for the plastic resin used in the molding machine 100 in the present embodiment, a transparent resin material ordinarily used as an optical material may be adopted. For example, preferably, appropriate resins set forth in Japanese patent applications Nos. 2004-144951, 2004-144953, 2004-144954, and others may be used. In particular, the resins may include acrylic resin, cyclic olefin resin, polycarbonate resin, polyester resin, polyether resin, polyamide resin, polyimide resin, and the like.

The refractive index of plastic resin decreases as the temperature rises, whereas the refractive index of most of inorganic particles increases as the temperature rises. Here, there is known a technique to prevent the refractive index from changing by causing the above two characteristics to act so as to negate each other. For the above purpose, inorganic particles of 30 nm or less, preferably, 20 nm or less, further preferably, within a range of 10 to 15 nm are dispersed in the resin as a base material.

Each shape of the gate 51, the runner 52, and the sprue 53 will be described below. The molding machine 100 in the present embodiment is provided with the gate 51 of a rectangular section and the runner 52 of a circular section. In this embodiment, the size of the gate 51 in its height direction ("a" in FIG. 3) is referred to as a "gate height"; the size of same in its width direction ("b" in FIG. 4), as a "gate width"; and the length ("L1" in FIG. 3) of same, as a "gate length". Further, the size of the runner 52 in its height direction ("A" in FIG. 3) is referred to as a "runner height"; and the size of same in its width direction ("B" in FIG. 4), as a "runner width".

Figure 5A:
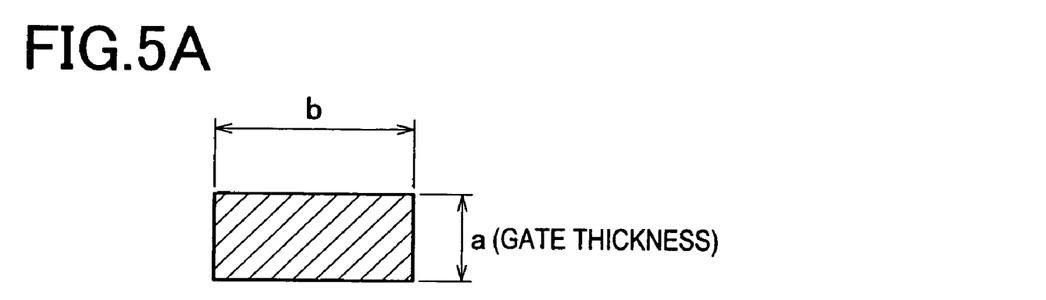
FIG. 5A is a sectional view of a rectangular gate (a gate height<a gate width)
Figure 5B:
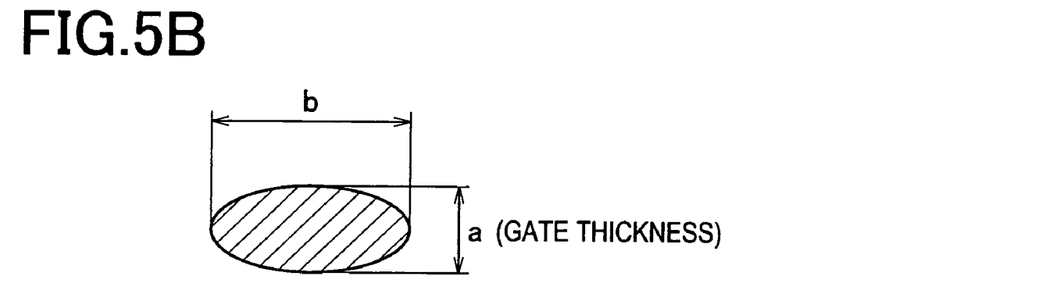
FIG. 5B is a sectional view of a circular gate (a gate height<a gate width)
Figure 6A:
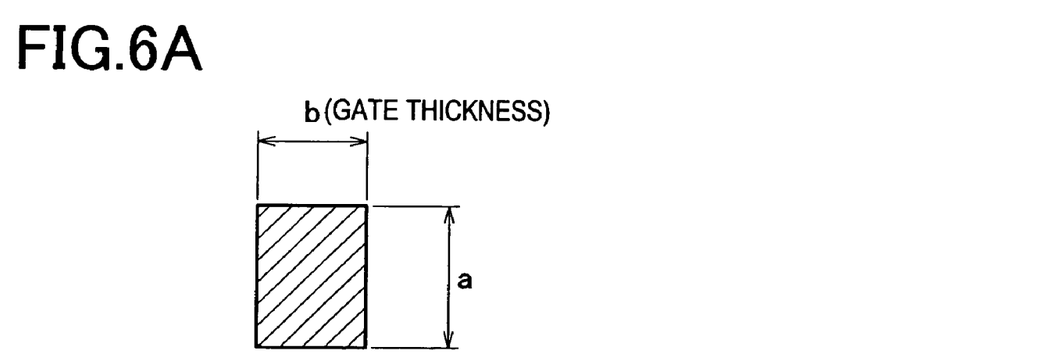
FIG. 6A is a sectional view of another rectangular gate (a gate height >a gate width)
Figure 6B:
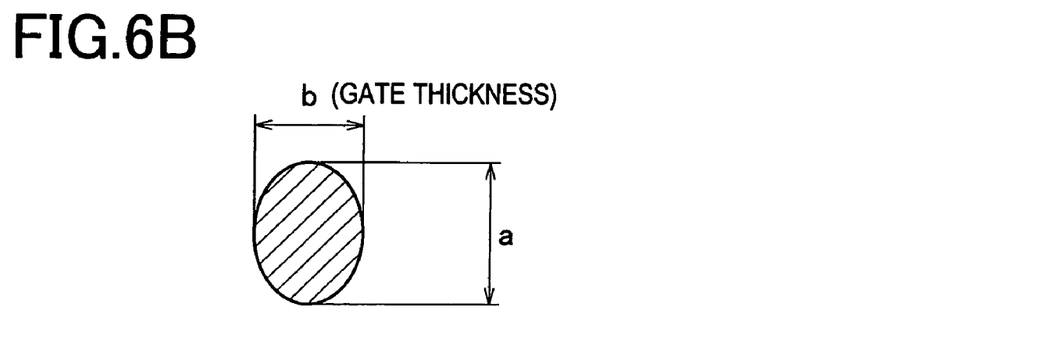
FIG. 6B is a sectional view of another circular gate (a gate height>a gate width)

Further, in this specification, a smaller size between the gate height and the gate width is referred to as a "gate thickness". To be concrete, when the gate height is smaller than the gate width as shown in FIGS. 5A and 5B, the gate height is referred to as the gate thickness. When the gate height is larger than the gate width as shown in FIGS. 6A and 6B, on the other hand, the gate width is referred to as the gate thickness. The optical lens molding machine is usually designed to have a gate of a smaller gate height than a gate width (FIGS. 5A and 5B).

In the following explanation, therefore, the example that the gate height is referred to as the gate thickness is described. The gate may include a gate of which the thickness changes along a gate channel, e.g., a fan-shaped gate. In this light, the minimum gate thickness of the gate channel is referred to as a "minimum gate thickness".

Figure 7A:
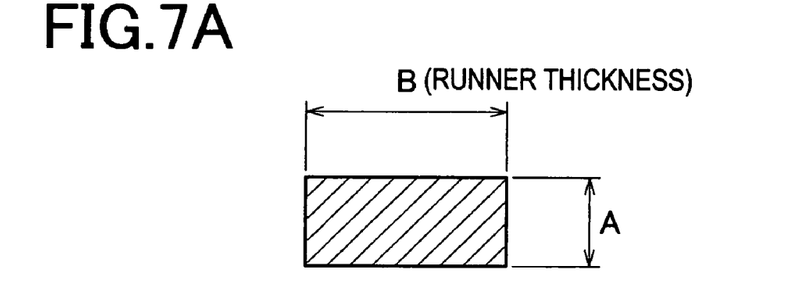
FIG. 7A is a sectional view of a rectangular runner (long sideways)
Figure 7B:
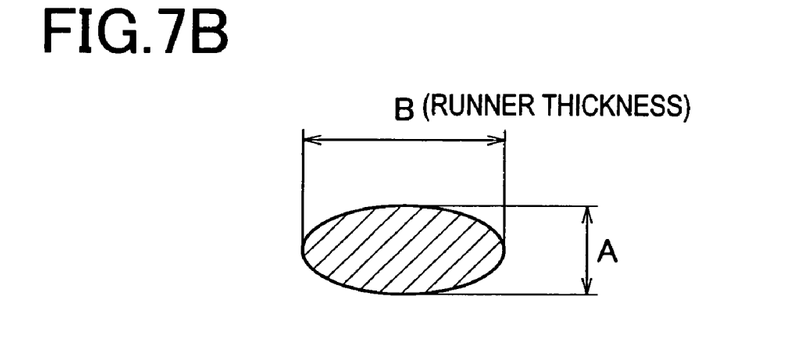
FIG. 7B is a sectional view of a circular runner (long sideways)
Figure 8A:
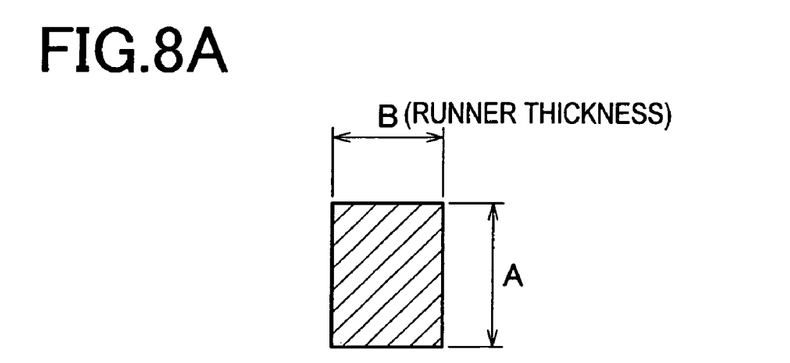
FIG. 8A is a sectional view of another rectangular runner (vertically long)
Figure 8B:
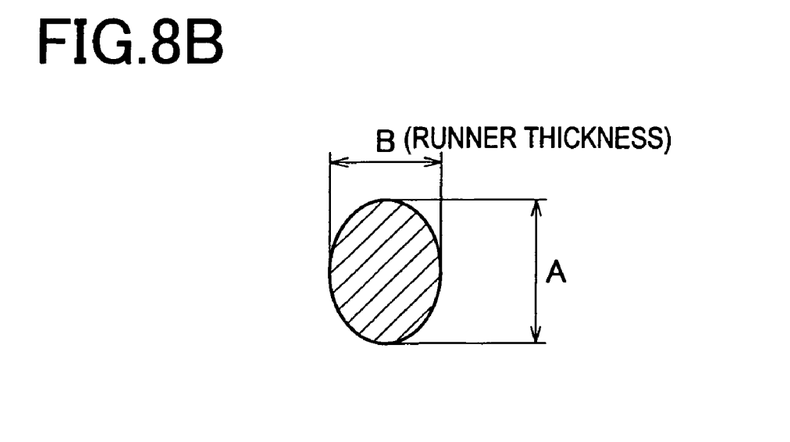
FIG. 8B is a sectional view of another circular runner (vertically long)

In this specification, a larger size between the runner height and the runner width is referred to as a "runner thickness". To be concrete, when the runner 52 is long sideways in section as shown in FIGS. 7A and 7B, the size in a width direction is referred to as a runner thickness. When the runner 52 is vertically long as shown in FIGS. 8A and 8B, on the other hand, the size in a vertical direction is referred to as the runner thickness. The runner thickness of the runner 52 is not necessarily uniform in a resin leading direction. Hence, the maximum runner thickness of the channel extending from the sprue 53 to the gate 51 is referred to as a "maximum runner thickness".

Figure 9:
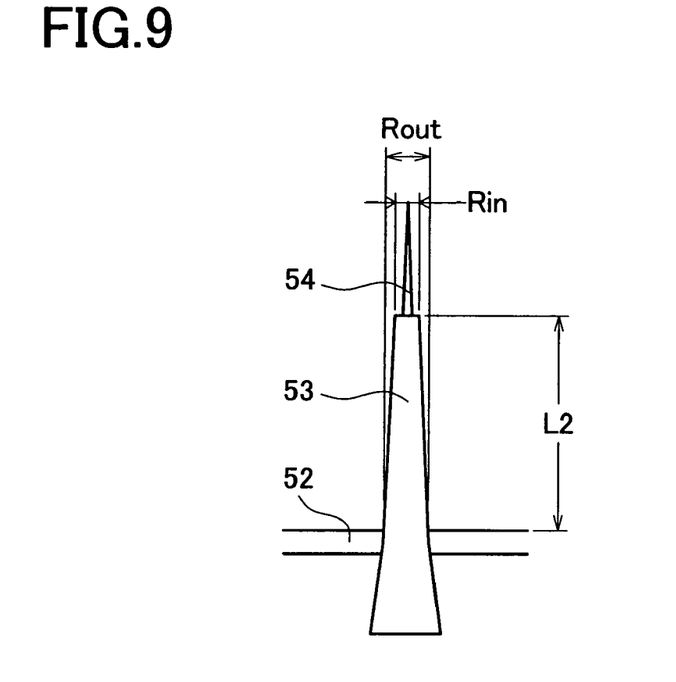
FIG. 9 is an explanatory view showing the shape of a sprue.

As shown in FIG. 9, further, the length (L2 in FIG. 9) of the sprue 53 from the inlet for molten resin to a joined portion with the runner 52 is referred to as a "sprue length", the diameter (Rin in FIG. 9) of the inlet for molten resin is referred to as an "inlet diameter", and the diameter (Rout in FIG. 9) of the connected portion with the runner 52 is referred to as an "outlet diameter".

The present applicant has experimentally found a link between the minimum gate thickness and the maximum runner thickness and a link between the gate length and the maximum runner thickness, and thus defined a ratio appropriate for achieving good transferability.

In the molding machine 100 in the present embodiment, the ratio between the minimum gate thickness and the maximum runner thickness is determined to meet the following condition (1):

$$0.2 < \text{"Minimum gate thickness"}/\text{"Maximum gate thickness"} < 1 \quad (1)$$

If this ratio is 0.2 or less, the flow of resin will be restricted sharply at the gate 51, leading to a decrease in filling property. This will result in a deterioration in transferability. Furthermore, stress concentrates on near the gate 51 and thus birefringence would significantly appear. If the ratio is 1.0 or more, on the other hand, the gate 51 will not serve as a gate. It is accordingly difficult to control the transferability of only the shape transfer section 50.

Moreover, in the molding machine 100 in the present embodiment, the ratio between the gate length and the maximum runner thickness is determined to meet the following condition (2):

$$0.4 < \text{"Gate length"}/\text{"Maximum runner thickness"} < 4 \quad (2)$$

If this ratio is 0.4 or less, it may exert an influence on a secondary process. Specifically, the gate length becomes too short to easily cut the gate 51 away from a molded product, or, the runner thickness becomes too large, which leads to a longer production cycle. If this ratio is 4 or more, in contrast, the gate length becomes too long, leading to a deformation during mold release.

Further, the present applicant has experimentally found a link among the outlet diameter of the sprue 53, the sprue length suitable for transferability, the outlet diameter of the sprue 53, and the inlet diameter of the sprue 53, and thus defined the size and ratio appropriate for achieving good transferability.

In the molding machine 100 in the present embodiment, the outlet diameter of the sprue 53 is determined to meet the following condition (3):

$$1.0 \text{ mm} < \text{"Outlet diameter of sprue"} < 5.5 \text{ mm} \quad (3)$$

If the outlet diameter of the sprue 53 is 1.0 mm or less, the temperature of resin will decrease quickly, which causes insufficient filling of resin into the shape transfer section 50. When the outlet diameter is 5.5 mm or more, in contrast, it will take long to cool and solidify the sprue 53 and also the production cycle will become longer.

Furthermore, in the molding machine 100 in the present embodiment, the sprue length is determined to meet the following condition (4):

$$10 \text{ mm} < \text{"Sprue length"} < 40 \text{ mm} \quad (4)$$

If the sprue length is 10 mm or less, the base mold 13 of the fixed mold 1 has to be formed with a recess for insertion of the nozzle (of the injection unit 80). Accordingly, stiffness of the mold would decrease. Thus, mold clamping and nozzle touch would then cause distortion of the mold. If the sprue length is 40 mm or more, in contrast, the temperature of resin will largely decrease before reaching the runner 52. This will result in insufficient filling of the resin into the shape transfer section 50. In addition, the molds will have large resistance at the time of mold opening, causing a demolding failure that the molded components remain in the fixed mold.

In the molding machine 100 in the present embodiment, the ratio between the outlet diameter and the inlet diameter of the sprue 53 is determined to meet the following condition (5):

$$1 < \text{"Outlet diameter of sprue"}/\text{"Inlet diameter of sprue"} < 8 \quad (5)$$

If this ratio is 1 or less, the shape of the sprue 53 is a reverse tapered shape. This inevitably causes a demolding failure that the molded components remain in the fixed mold. If the ratio is 8 or more, in contrast, molten resin will flow in the channel of the sprue 53 sharply widened toward the outlet. The resin injection pressure and speed therefore become unstable. Consequently, the molding stability will decrease. Stringiness 54 (see FIG. 9) will become large.

In the molding machine 100, each shape of the gate 51, runner 52, and sprue 53 is determined as described above in detail. Specifically, the "Minimum gate thickness"/the "Minimum runner thickness" is determined within a range of 0.2 to 1.0 (the condition (1)), thereby avoiding a sharp restriction in the flow of resin to stabilize the temperature of the resin. This makes it possible to achieve good transferability. Stress can also be prevented from concentrating on near the gate 51, so that birefringence near the gate can be reduced. Further, the "Gate length"/the "Maximum runner thickness" is determined within a range of 0.4 to 4.0 (the condition (2)), thereby preventing deformation at the time of mold releasing and enabling reduction of production cycle. As above, since each size of the gate 51 and the runner 52 meets the above conditions (1) and (2), an apparatus for producing small-size and high-precise optical components can be provided with good transferability and stability of molded products.

The outlet diameter of the sprue 53 is determined within a range from more than 1.0 mm to less than 5.5 mm (the condition (3)), thereby improving the flowability of resin and ensuring good transferability. Further, the sprue length is determined within a range from more than 10 mm to less than 40 mm (the condition (4)), thereby further improving the flowability and ensuring good transferability. It is further possible to prevent a demolding failure and a mold-releasing failure, and thus provide molding stability. In addition, the "Outlet diameter"/ "Inlet diameter" of the sprue 53 is determined within a range of more than 1 to less than 8 (the condition (5)), thereby further preventing a demolding failure and a mold-releasing failure, and thus ensuring molding stability. Also, the stringiness 54 can be restrained. Accordingly, when the size of the sprue 53 meets all the above conditions (3), (4), and (5), it is possible to achieve good transferability and stability of molded products.

The embodiment is merely an example and does not limit the present invention. The present invention may be embodied in other specific forms without departing from the essential characteristics thereof. For instance, the injection unit, which is not limited to the preplasticization type and the ln-line screw type, may be for example an in-line plunger type.

In the molding machine 100 in the embodiment, the mold for molding the plastic lens is structured as a core and a cavity separately, but it is not limited thereto. That is, the mold may be configured as an integrated combination of a core and a cavity (that the transfer section for the lens portion and the transfer section for the flange portion are integrally provided).

The gate 51 in the molding machine 100 in the embodiment is rectangular in section but may be circular. The runner 52 which is circular in section may alternatively be rectangular.

As for the optical component as the product to be molded, when the plastic resin as the base material is mixed with fine particles, the mixing method thereof is not particularly limited. Any of the following methods may be employed. That is, a method in which, after the plastic resin and the fine particles are prepared independently, both are mixed with each other; a method in which the plastic resin is prepared under such a condition that prepared fine particles are included; a method in which the fine particles are prepared under such a condition that prepared plastic resin is existing; a method in which both of the plastic resin and the fine particles are prepared simultaneously etc. In particular, there is an appropriate method in which, for example, one solution in which the plastic resin is solved and the other solution in which the fine particles are uniformly dispersed are mixed uniformly; thus, by mixing the plastic resin, which is poor in solubility, with a solution, an intended composition of matters is obtained. However, the mixing method is not limited to the above.

Additionally, the mixing level between the plastic resin and the fine particles in the optical component is not particularly limited. However, it is preferred that both are mixed uniformly. In the case where the level of mixing is insufficient, particularly, the optical characteristics such as refractive index, Abbe's number and transmission of a light beam may be influenced. And further, the processing performance of the resin such as thermal plasticity, molten-plasticity and the like may be influenced. Since the level of mixing may be influenced by the preparation method thereof, an appropriate method should be selected while taking into consideration the characteristics of the plastic resin and the fine particles. In order to uniformly mix both of the plastic resin and the fine particles, a method in which the plastic resin and the fine particles are directly combined may be appropriately employed.

According to the present invention, as obvious from the above description, an optical component molding apparatus for molding optical components each of which is of a small size and high precision can be provided with good transferability and stability of molded products.

What is claimed is:

1. An optical component molding apparatus for simultaneously producing a plurality of optical components, each having an outer diameter of 2 mm to 12 mm, the apparatus comprising:
   a fixed mold and a movable mold;
   a shape transfer section having a diameter of about between 2 mm and 12 mm, and configured to mold the plurality of optical components;
   the shape transfer section defined by a first cavity portion and a first core portion in the fixed mold, and by a second cavity portion and a second core portion in the movable mold;
   the movable mold configured to contact the fixed mold under a clamping force of less than or equal to 150 kN, wherein a resin material is injected into the shape transfer section between the molds clamped by the clamping force, and wherein said mold clamping force is applied during a injection of the resin material into the shape transfer section;
   a sprue configured to receive a source of molten resin material;
   a runner in communication with the sprue configured to direct a flow of the molten resin material;
   a gate formed as gate channel between the shape transfer section and the runner, and configured to direct the resin material from the runner into the shape transfer section to form the optical component;
   each optical component having an optical surface with surface roughness of 20 nm or less; and wherein relative dimensions of the gate and runner are such that a ratio of minimum gate thickness to maximum runner thickness is between 0.2 and 1.0.

2. The optical component molding apparatus according to claim 1, wherein the gate and the runner are formed having relative dimensions such that a ratio of gate length to maximum runner thickness is between 0.4 and 4.0.

3. The optical component molding apparatus according to claim 1, wherein an outlet diameter of the sprue is greater than or equal to 1 mm so as to maintain a sufficiently high temperature of the resin material so that the shape transfer section is completely filled with the resin material, and wherein an outlet diameter of the sprue is less than or equal to 5.5 mm to permit the resin material to cool within a sufficiently short period of time.

4. The optical component molding apparatus according to claim 1, wherein a length of the sprue is between 10 mm and 40 mm.

5. The optical component molding apparatus according to claim 1, wherein the sprue includes an outlet portion and an inlet portion having relative dimensions such that a ratio of a diameter of the outlet portion to a diameter of the inlet portion is between 1 and 8.

6. The optical component molding apparatus according to claim 1 further comprising a transfer member which is insertable in at least one of the movable mold and the fixed mold, and wherein the transfer member is provided with the shape transfer section.

7. The optical component molding apparatus according to claim 1, wherein at least four optical components are produced in one clamping operation.

8. The optical component molding apparatus according to claim 1, further including a spacer block disposed between corresponding cavity portions and core portions and configured to adjust a position of the cavity portions.

9. The optical component molding apparatus according to claim 1, wherein at least one of the fixed mold and the movable mold is constructed of a transferring member for forming an optical surface of the optical component, and a face mold which holds the transferring member, and wherein a position of the transferring member is adjustable with respect to the face mold in a direction perpendicular to a clamping direction of the mold.

10. The optical component molding apparatus according to claim 1, wherein the gate channel has a fan-shaped taper along its length.

* * * * *